Patented Mar. 14, 1939

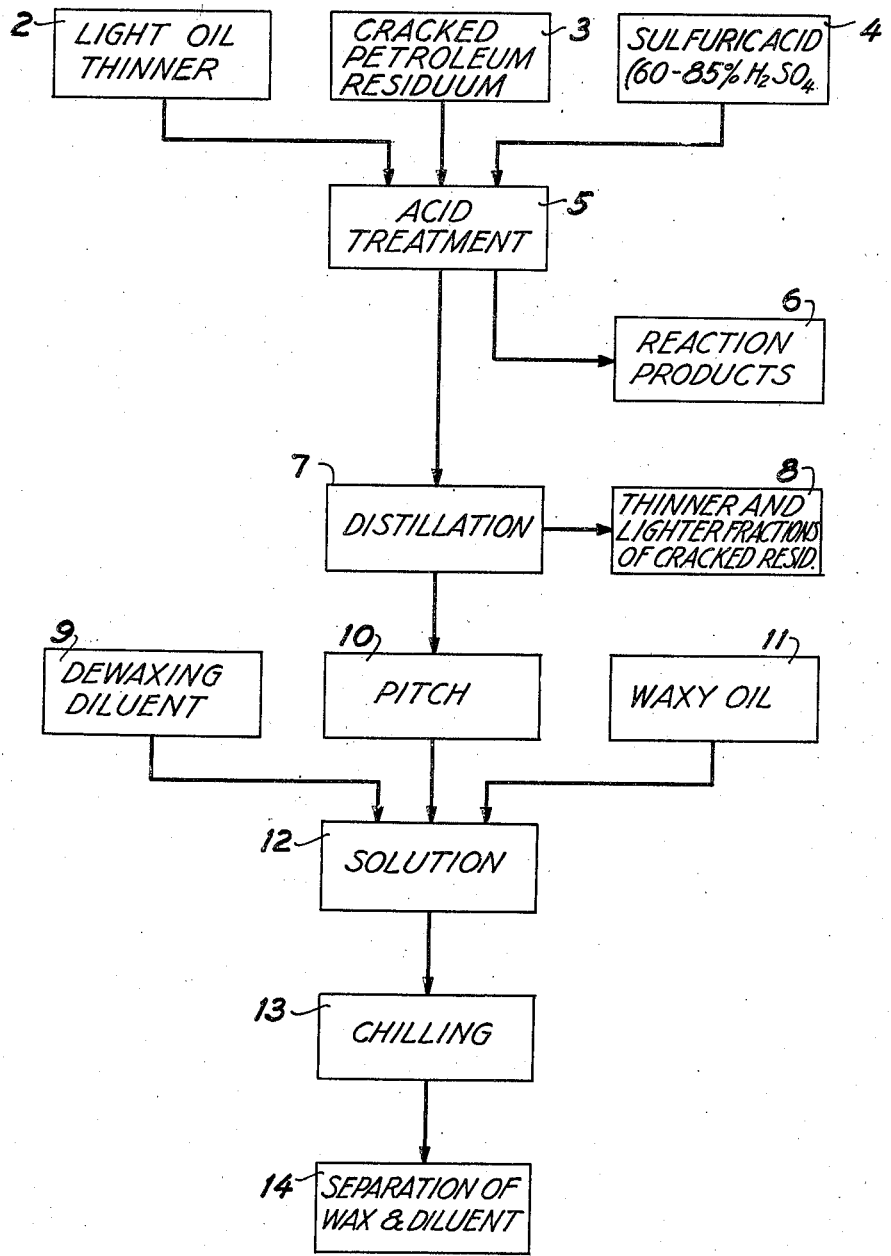

2,150,501

UNITED STATES PATENT OFFICE 2,150,501

DEWAXING OF PETROLEUM OILS

Ralph A. Halloran and Arthur L. Lyman, Berkeley, Calif., assignors to Standard Oil Company of California, San Francisco, Calif., a corporation of Delaware Application August 1, 1936, Serial No. 93,881

6 Claims. (Cl. 196—18)

This invention relates to a process for the separation of wax from oil, such as petroleum, and more particularly to a process in which improved separation of wax is obtained by adding to the wax-containing oil a small quantity of a substance which is effective in modifying the crystal formation of the wax.

The dewaxing of lubricating oil stocks is universally carried out by thinning the wax-bearing oil with an oil-soluble liquid of relatively low boiling point and specific gravity, chilling the solution to precipitate the wax, separating the oil solution from the precipitated wax, and finally separating oil and thinner by distillation. Although the processes in practical use all follow this general scheme, they differ greatly in the nature of thinner used, method of chilling and mechanical means of separating solidified wax from oil, as well as in various other details. The major limitation on the efficiency of the dewaxing process, and consequently the object of most of the efforts being made to improve it, lies in the step of separating precipitated wax from the oil solution. The ease and relative completeness of this separation vary widely with different oils and are also influenced markedly by the nature of the thinner, chilling technique, etc. Comparatively recently it has been found that an independent influence can be exerted on this step by the addition to the waxy oil of a relatively small amount of a substance capable of altering the form of the wax as it solidifies. Properly chosen materials of this kind may have a very great effect on the facility with which wax may be subsequently separated, increasing the yield of dewaxed oil, speeding up the rate of separation and producing a drier and more easily washed wax cake.

Various substances have been suggested and used for the purpose of modifying or "conditioning" wax crystal formation. The subject of our invention is a substance which gives results superior to those obtained by the use of any substances heretofore disclosed. One advantage of the use of the material prepared by the method herein described is that it makes possible a more rapid and complete separation of wax from oil, whether this separation is carried out by cold settling, centrifuging, filtering or the equivalent. Another improvement arises from the fact that the material of our invention is extremely concentrated, i. e., contains a minimum of impurities or substances which are ineffective in contributing to the desired crystal modification.

We have found that the residuum from the thermal cracking of petroleum contains an exceptionally large percentage of compounds which possess the specific modifying property which we desire. We have further discovered that these modifying substances may be obtained in a concentrated form substantially free of contamination with residual substances which are not only ineffective in producing the desired modifying action, but also which lower the quality of the dewaxed oil. This we do by treating the residuum or tar with sulfuric acid, removing the sludge so formed, then distilling the treated tar under vacuum to produce a very viscous pitch. The pitch so prepared is dissolved in the oil which is to be dewaxed together with the dewaxing diluent, and this is refrigerated to the desired point at which wax precipitates, and is then subjected to a process of wax separation by any of the methods hitherto used. The amount of this concentrated pitch modifier which is added will depend on the nature and quantity of the wax in the waxy oil, but will generally not exceed 1%, referred to the weight of waxy oil.

In preparing this concentrated modifier we prefer to proceed as follows: we first thin the cracked residuum with a quantity of lighter oil such as kerosene for example. We have found that, in most cases, about 1 volume of kerosene or similar distillate added to 2 volumes of residuum produces an oil of the desired body. We treat this residuum solution with relatively weak sulfuric acid and by this we mean sulfuric acid of 60 to 85% strength. Stronger acid tends to destroy in part the active modifying agent contained in the cracking still residuum. Recovered or black acid containing 70% $H_2SO_4$ or thereabouts, and obtained by hydrolysis of sulfuric acid sludge and partial concentration, is a satisfactory acid for this purpose. When such black acid containing about 70% $H_2SO_4$ is used, about 1 lb. of acid per gallon of residuum is sufficient. The acid treated residuum is then settled or otherwise treated for the removal of the sludge formed. The residuum, after separation and removal of the sludge, is subjected to vacuum distillation at a temperature sufficient to remove substantially all of the diluent, and the lighter components of the residuum. For this purpose it is usually necessary to use a temperature of 600° to 670° F. under a vacuum of about 28 inches of mercury. Under these conditions the residual product left in the still and containing in concentrated form the desired modifying agents, is a pitch-like substance of high flash point and high viscosity. By this method an exceptionally high yield of modifying substance is attained from a unit weight of the original cracking still residuum. Moreover, substantially all of the pitch concentrate is oil-soluble,—an important consideration when the pitch is subsequently blended with the waxy oil.

The concentrated modifier is then added to the waxy oil in the desired proportion, usually less than 1% by weight. As is well known most commercial dewaxing processes involve the addition to the waxy oil of a diluent which may be naphtha or some other relatively low boiling wax anti-solvent. Liquefied normally gaseous hydrocarbons, such as propane, are frequently used for such diluent. The modifier described herein is a particularly effective aid to the separation of wax from solutions of this character.

The addition of our modifier may be made either before or after or along with the addition of the diluent. The only requirement is that the modifier be added at such a temperature or under such other conditions as will insure substantially complete solution of the modifier in the mixture of waxy oil and solvent. Our invention is not limited to particular methods of chilling the waxy oil or to particular methods of separating the precipitated wax.

We have found that cracking still residue resulting from the cracking of distillate oils such as gas oils are preferable, for our purpose, to residua resulting from the cracking of residual stocks such as high flash tars and asphalts.

The diluent which is added to the cracking still residuum for the purpose of facilitating the acid treatment thereof, may be any oil sufficiently low in boiling point so that it may be separated easily from the residuum after treatment. The amount of diluent to be used is not critical but will depend largely on the nature of the residuum being treated. It is, in general, desirable to select an oil for this purpose which is comparatively unreactive with the acid. As indicated above, kerosene distillate is a satisfactory diluent. We have found good results are obtained by the use of from ½ to 1 volume of diluent per volume of residuum.

As stated above our improved conditioner is in the form of a viscous pitch. The reason for this is that we have found that the desirable wax modifying substances are for the most part among the higher boiling point constituents of the residuum. The lower boiling non-pitch-like fractions of the residuum (which are poor in conditioning property) are undesirable in that they adversely affect the color, Conradson carbon and stability of the oil in which they are dissolved. Hence we eliminate these lighter fractions from the residuum by distillation. This may be done before or after the acid treatment. We prefer to do it after treatment in the same operation in which we distill off the kerosene or similar thinner. The extent of this concentration by distillation is to some extent within the discretion of the refiner, in view of the nature of the stock to be dewaxed, the quality of the residuum, the specifications required in the finished oil, etc., but in any case it is desirable that the conditioner be concentrated to 400° F. flash point or higher. We find that the removal by distillation of all fractions which vaporize at 600° F. under a vacuum of 28 inches of mercury gives a satisfactory product in the case of residua from California crudes.

The relation of the steps of the process as described above will be readily understood by reference to the drawing which is a schematic flow line of the process, and which is largely self-explanatory. The light oil thinner 2 may, of course, be mixed with the cracked petroleum residuum 3 before injection into the acid treating apparatus 5. The latter may be any well known type of apparatus designed to bring about thorough contacting of the oil and acid, and to separate the reaction products or "sludge" 6 so formed. Likewise, the distillation step 7 may be carried out in any suitable equipment adapted to perform the function described, i. e., to produce a pitch as bottom product and to remove overhead the thinner and the undesired lighter fractions of the cracked residuum 8. The diluent which is to be used in dewaxing 9, the proper quantity of pitch 10 and the waxy oil 11 are brought into solution 12 and this solution is then subjected to chilling 13 in order to precipitate the wax, and the wax slurry so formed is processed by any of the well known methods for the separation 14 of wax and diluent from the oil.

The following is an example of the process of preparing and using the wax crystal modifier of our invention. This example is illustrative only.

Commercial pressure tar from the cracking (Dubbs process) of gas oil from Midway, California crude was diluted with ½ volume of kerosene distillate and the mixture was treated with 1 lb. of 70% sulfuric acid per gallon of mixture, applied in two dumps. After removal of the acid sludge, the yield of treated residue was 80%. The treated mixture was then reduced to pitch in an externally fired vacuum still, using steam as distillation aid. The pitch product had the following specifications:

Penetration (77° F.) _____ 7
Melting point _____°F__ 142
Flash _____°F__ 565
Ductility _____ 0

This conditioner was added to heavy lubricating stock, previously solvent treated, from Kettleman, California crude at the rate of .25% by weight. After the conditioner had been thoroughly dissolved in the lubricating oil, 4 volumes of low boiling point petroleum naphtha were added at a temperature of 130° F. sufficient to produce a homogeneous solution. This solution was chilled to about −40° F., and the precipitated wax removed.

The dewaxed oil was then given a conventional adsorption clay treatment for the purpose of bringing the color, etc. to the desired standard. In this case a very small amount of activated contact clay gave a highly refined oil. Clay at the rate of 20,000 gallons per ton resulted in a color of 5¼ Robinson. 10,000 gallons per ton resulted in a color of 8½ Robinson. Clay treatment is not essential, but is usually desired by refiners in order to remove traces of unstable matter which may have been left in the oil, as well as to bring the final color of the oil to a predetermined standard.

The extent of the advantages obtainable by the use of the conditioner described above is illustrated by the following examples of dewaxing operations carried out by us.

*Treatment No. 1.*—Waxy solvent treated lubricating distillate (viscosity 62 seconds Saybolt at 210° F.) was dissolved in four volumes of liquid propane at 120° F. The mixture was cooled to −40° F., filtered and the wax cake washed with two volumes of propane at −40° F.

*Treatment No. 2.*—Exactly the same as Treatment No. 1 in all respects except that, prior to admixture of propane, 2% by weight of conditioner prepared as described above was dissolved in the waxy oil.

The results of these two treatments were as follows:

|  | Treatment No. 1 | Treatment No. 2 |
|---|---|---|
| Yield, dewaxed oil before washing cake | 40% | 65% |
| Yield, dewaxed oil after washing cake | 49% | 76% |
| Thickness of cake | 2½ in. | 1 in. |

Similarly, the effect when using a normally liquid dewaxing diluent is illustrated by the following:

*Treatment No. 3.*—The same waxy oil used in Treatments 1 and 2 was dissolved in three volumes of a straight-run hydrocarbon fraction boiling between 90° F. and 160° F. The solution was cooled to −40° F. Long before this temperature was reached, however, the whole set up into a solid gel. After reaching −40° F. the structure of the gel was broken as much as possible by violent agitation, producing a semi-fluid slurry.

*Treatment No. 4.*—Exactly the same as Treatment No. 3 except that 0.25% of conditioner prepared as described herein was dissolved in the waxy oil. At −40° F. the mixture was very fluid and the wax dense and granular, settling out by gravity at such a rate as to form 0.2 inch of clear supernatant liquid per minute.

*Treatment No. 5.*—Repetition of Treatment No. 4 using 0.50% of conditioner.

The results of these treatments were as follows:

|  | Treatment No. 3 | Treatment No. 4 | Treatment No. 5 |
|---|---|---|---|
| Yield, dewaxed oil | Less than 30% | 70% | 74% |
| Thickness of cake | 4 in. | 1¾ in. | 1¼ in. |
| Filter rate, gal./sq. ft./hr | Less than 0.10 | 6 | 23 |

Comparative cold settling tests showed that the conditioner prepared by the method of our invention is approximately twice as effective as untreated cracking still residua, measured in terms of proportion required for a given rate of wax separation. Moreover, when these two materials are used in amounts necessary to give equal conditioning effects, a comparison of the dewaxed oil shows that our conditioner results in a 75% reduction in Sligh test (resistance to oxidation), a 50% reduction in Conradson carbon, and a very marked superiority in color.

The advantage of using concentrated conditioner prepared by our method, over the use of unprocessed distillation residua is indicated by the following tests on samples of the same oil containing .25% by weight of the two types of material.

|  | N. P. A. color | Conradson carbon | Sligh |
|---|---|---|---|
| Treated conditioner | 5 | 0.14 | 10 |
| Untreated conditioner | 4 dil. | 0.17 | 22 |

In addition to its high efficiency as a dewaxing aid, the material prepared by the method of our invention is rich in substances which impart a desirable green "bloom" or fluorescence to the oils in which it is dissolved. Those waxy oils from which separation of solidified wax is the most difficult are precisely those which have an objectionable blue appearance when viewed by reflected light, such as light overhead lubricating distillates and stocks which have been subjected to acid or selective solvent treatment. The use of our conditioner imparts a pleasing distinctive green bloom to such oils.

Having thus described our invention, we claim:

1. A method of dewaxing oil comprising dissolving in the oil a diluent and a minor quantity of the product formed by treating liquid residuum of a petroleum oil cracking operation with sulfuric acid containing not less than 60% and not more than 85% $H_2SO_4$, removing the sludge and reducing the treated residue by distillation to a viscous pitch, chilling the solution of oil diluent and pitch to cause wax to precipitate therefrom and separating the wax from the oil.

2. A method of dewaxing lubricating oil comprising treating residuum from petroleum cracking stills with sulfuric acid containing not less than 60% and not more than 85% $H_2SO_4$, separating and removing the resulting sludge, subjecting the tar remaining from such acid treatment to a vacuum distillation at a temperature sufficient to remove the lighter components of said tar and retain a heavy pitch containing wax crystal modifying constituents, adding a minor quantity of this pitch to the wax-containing oil, adding a diluent to the oil, chilling the solution, and separating the precipitated wax therefrom.

3. In the dewaxing of petroleum oil by mixing the oil with a diluent, chilling to precipitate wax, and separating wax from oil, the improvement which comprises dissolving in the wax-bearing oil prior to chilling a small amount of the product obtained by thinning a residuum from a petroleum oil cracking operation with a relatively low-boiling petroleum distillate, treating the thinned distillate with sulfuric acid containing not less than 60% and not more than 85% $H_2SO_4$, removing the sludge so formed, then removing by distillation the added thinner and a part of the lighter fractions of the residuum.

4. In the process of removing wax from petroleum oil by mixing the oil with a diluent, chilling to precipitate wax, and separating wax from oil, the improvement comprising dissolving in the wax-bearing oil prior to chilling a minor quantity of the product obtained by thinning a residuum from a petroleum oil cracking operation with a relatively low-boiling petroleum distillate, treating the thinned residuum with sulfuric acid having an $H_2SO_4$ content of 60% to 85%, removing the sludge so formed, then subjecting the treated residuum to distillation, thereby removing the added thinner together with a sufficient portion of the lighter fractions of the treated residuum to leave a viscous pitch having a flash point of 400° F. or higher.

5. In the method of dewaxing petroleum oil by mixing the oil with a diluent, chilling to precipitate wax, and separating wax from oil, the improvement comprising dissolving in the wax-bearing oil prior to chilling a small amount of the viscous pitch obtained by thinning a residuum from a petroleum oil cracking operation with a relatively low-boiling petroleum distillate, treating the thinned residuum with sulfuric acid containing not less than 60% or more than 85% by weight of $H_2SO_4$, removing the sludge so formed, separating from the treated residuum by distillation the added thinner and a substantial portion of the lighter fractions of the treated residuum.

6. In the art of dewaxing petroleum oil wherein the wax-bearing oil is mixed with a diluent, chilled to a temperature at which wax solidifies, and subjected to mechanical means of separating solidified wax from oil, the improvement comprising dissolving in the wax-bearing oil prior to chilling a minor quantity of viscous pitch prepared by treating a petroleum cracking still residuum with sulfuric acid containing not more than 85% by weight of $H_2SO_4$, removing the sludge so produced and subjecting the said residuum to non-cracking distillation under subatmospheric pressure for a sufficient time and at a sufficient temperature to produce a distillation residuum having a flash point of 400° F. or higher.

RALPH A. HALLORAN.
ARTHUR L. LYMAN.